(12) United States Patent
Mielenz et al.

(10) Patent No.: US 11,117,564 B2
(45) Date of Patent: Sep. 14, 2021

(54) METHOD AND DEVICE FOR THE DRIVERLESS GUIDANCE OF A MOTOR VEHICLE WITHIN A PARKING LOT

(71) Applicant: Robert Bosch GmbH, Stuttgart (DE)

(72) Inventors: Holger Mielenz, Ostfildern (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 583 days.

(21) Appl. No.: 15/751,940

(22) PCT Filed: Jul. 5, 2016

(86) PCT No.: PCT/EP2016/065859
§ 371 (c)(1),
(2) Date: Feb. 12, 2018

(87) PCT Pub. No.: WO2017/036640
PCT Pub. Date: Mar. 9, 2017

(65) Prior Publication Data
US 2018/0236993 A1    Aug. 23, 2018

(30) Foreign Application Priority Data

Sep. 3, 2015    (DE) .................... 10 2015 216 881.6

(51) Int. Cl.
*B60W 10/20*    (2006.01)
*B62D 15/02*    (2006.01)
(Continued)

(52) U.S. Cl.
CPC ............ *B60W 10/20* (2013.01); *B60W 40/02* (2013.01); *B62D 15/0285* (2013.01);
(Continued)

(58) Field of Classification Search
CPC ...... B60W 10/20; B60W 40/09; B60W 40/06; B60W 40/11; B60W 30/09; B60W 10/06;
(Continued)

(56) References Cited

U.S. PATENT DOCUMENTS 6,223,847 B1 *    5/2001    Shimizu ............... B62D 15/028
                                                116/28 R
7,865,300 B2 *    1/2011    Seacat .............. G08G 1/096861
                                                701/533

(Continued)

FOREIGN PATENT DOCUMENTS

CN       103373349 A    10/2013
DE    102012203235 A1     9/2013
(Continued)

OTHER PUBLICATIONS

International Search Report dated Oct. 17, 2016, of the corresponding International Application PCT/EP2016/065859 filed Jul. 5, 2016.

(Continued)

*Primary Examiner* — Luis A Martinez Borrero
(74) *Attorney, Agent, or Firm* — Norton Rose Fulbright US LLP; Gerard Messina

(57) ABSTRACT

A method for the driverless guidance of a motor vehicle within a parking lot that includes sensing one or a plurality of road user(s) within the parking lot, predicting a respective movement of the one or the plurality of road user(s), and automatic driverless guidance of the motor vehicle within the parking lot based on the respective predicted movement. A corresponding device, a parking lot, as well as a computer program, are also described.

10 Claims, 2 Drawing Sheets

(51) Int. Cl.
*G08G 1/14* (2006.01)
*G08G 1/16* (2006.01)
*G05D 1/02* (2020.01)
*B60W 40/02* (2006.01)
*G08G 1/04* (2006.01)

(52) U.S. Cl.
CPC ........... *G05D 1/0297* (2013.01); *G08G 1/146* (2013.01); *G08G 1/164* (2013.01); *B60W 2420/42* (2013.01); *G05D 1/0272* (2013.01); *G05D 1/0282* (2013.01); *G05D 2201/0213* (2013.01); *G08G 1/04* (2013.01); *G08G 1/142* (2013.01); *G08G 1/168* (2013.01)

(58) Field of Classification Search
CPC ...... B60W 50/14; B60W 40/08; B60W 40/02; B60W 30/06; B60W 30/17; B62D 15/0285; B62D 15/02; B62D 15/028; B62D 15/027; G05D 1/0291; G05D 1/02; G05D 1/0088; G05D 2201/0213; G05D 1/10; G05D 1/0297; G05D 1/0287; G05D 1/0274; G08G 1/144; G08G 1/143; G08G 1/14; G08G 1/142; G08G 1/165; G08G 1/163

See application file for complete search history.

(56) References Cited

U.S. PATENT DOCUMENTS

| | | | | |
|---|---|---|---|---|
| 8,660,734 | B2* | 2/2014 | Zhu | B60R 1/00 701/23 |
| 8,948,955 | B2* | 2/2015 | Zhu | B60T 8/885 701/23 |
| 9,381,916 | B1* | 7/2016 | Zhu | G01S 17/931 |
| 9,495,874 | B1* | 11/2016 | Zhu | G06K 9/00805 |
| 9,734,390 | B2* | 8/2017 | Maurer | G06K 9/00342 |
| 9,862,416 | B2* | 1/2018 | Imai | G08G 1/168 |
| 9,959,761 | B2* | 5/2018 | Tsyrklevich | G08G 1/0112 |
| 9,964,954 | B1* | 5/2018 | Silver | G08G 1/165 |
| 10,023,231 | B2* | 7/2018 | Ramanujam | B62D 15/0285 |
| 10,048,698 | B2* | 8/2018 | Nordbruch | G05D 1/0276 |
| 10,222,224 | B2* | 3/2019 | Johnson | G08G 1/143 |
| 10,268,899 | B2* | 4/2019 | Cai | G06K 9/00771 |
| 10,293,822 | B1* | 5/2019 | Silver | G06K 9/00805 |
| 10,525,974 | B2* | 1/2020 | Nakada | B62D 15/027 |
| 10,739,780 | B1* | 8/2020 | Silver | G08G 1/096783 |
| 10,741,080 | B2* | 8/2020 | Nordbruch | G08G 1/164 |
| 2004/0039632 | A1* | 2/2004 | Han | G06Q 20/32 705/13 |
| 2005/0035879 | A1* | 2/2005 | Gotzig | B60Q 9/006 340/932.2 |
| 2006/0255969 | A1* | 11/2006 | Sakakibara | B62D 15/029 340/932.2 |
| 2006/0293856 | A1* | 12/2006 | Foessel | G01S 13/931 701/301 |
| 2007/0035416 | A1* | 2/2007 | Tanaka | B60T 7/18 340/906 |
| 2010/0033348 | A1* | 2/2010 | Kawabata | G06K 9/00812 340/932.2 |
| 2010/0156672 | A1* | 6/2010 | Yoo | G08G 1/14 340/932.2 |
| 2011/0273310 | A1* | 11/2011 | Kadowaki | B62D 15/0285 340/932.2 |
| 2012/0083960 | A1* | 4/2012 | Zhu | G05D 1/0276 701/23 |
| 2012/0188100 | A1* | 7/2012 | Min | E04H 6/426 340/932.2 |
| 2012/0287279 | A1* | 11/2012 | Tanaka | G08G 1/168 348/148 |
| 2012/0296523 | A1* | 11/2012 | Ikeda | B62D 15/0275 701/41 |
| 2013/0024049 | A1* | 1/2013 | Yoshioka | B62D 1/00 701/2 |
| 2013/0096816 | A1* | 4/2013 | Takano | B62D 15/0275 701/400 |
| 2013/0231824 | A1* | 9/2013 | Wilson | G01C 21/3415 701/26 |
| 2013/0265175 | A1* | 10/2013 | Kang | B62D 15/029 340/932.2 |
| 2013/0289825 | A1* | 10/2013 | Noh | B62D 15/027 701/42 |
| 2014/0046506 | A1* | 2/2014 | Reichel | B62D 15/0285 701/2 |
| 2014/0067207 | A1* | 3/2014 | Noh | G08G 1/168 701/41 |
| 2014/0266693 | A1* | 9/2014 | Moulton | G08B 21/02 340/539.12 |
| 2015/0130640 | A1* | 5/2015 | Ryu | G06K 9/00812 340/932.2 |
| 2015/0160653 | A1* | 6/2015 | Cheatham, III | B60W 30/0956 701/23 |
| 2015/0166062 | A1* | 6/2015 | Johnson | B60W 10/20 701/41 |
| 2015/0210216 | A1* | 7/2015 | Reichel | B60W 30/095 701/48 |
| 2015/0266477 | A1* | 9/2015 | Schmudderich | B60W 40/04 701/98 |
| 2015/0279213 | A1* | 10/2015 | Balter | G01C 21/36 705/13 |
| 2015/0339535 | A1* | 11/2015 | Utagawa | G06T 7/246 348/118 |
| 2015/0346727 | A1* | 12/2015 | Ramanujam | B62D 15/0285 701/23 |
| 2015/0353080 | A1* | 12/2015 | Mukaiyama | E05B 77/54 701/23 |
| 2016/0196747 | A1* | 7/2016 | Tsyrklevich | G08G 1/143 701/532 |
| 2016/0229398 | A1* | 8/2016 | Baumgaertel | B60W 50/0097 |
| 2016/0231133 | A1* | 8/2016 | Johnson | B60R 25/102 |
| 2016/0272244 | A1* | 9/2016 | Imai | G08G 1/166 |
| 2017/0025004 | A1* | 1/2017 | Nordbruch | G08G 1/04 |
| 2017/0254654 | A1* | 9/2017 | Nordbruch | G05D 1/028 |
| 2017/0259850 | A1* | 9/2017 | Yamashita | B62D 15/028 |
| 2017/0287330 | A1* | 10/2017 | Tsyrklevich | G01C 21/3667 |
| 2017/0308095 | A1* | 10/2017 | Irion | G05D 1/0282 |
| 2017/0309177 | A1* | 10/2017 | Hoffmann | G08G 1/146 |
| 2017/0323565 | A1* | 11/2017 | Nordbruch | G08G 1/096741 |
| 2017/0329341 | A1* | 11/2017 | Rakshit | G08G 1/143 |
| 2018/0037262 | A1* | 2/2018 | Imai | G05D 1/0055 |
| 2018/0122245 | A1* | 5/2018 | Penilla | G01S 13/931 |
| 2019/0019407 | A1* | 1/2019 | Nakhjavani | G06K 9/00812 |
| 2019/0071069 | A1* | 3/2019 | Nordbruch | B60W 30/09 |
| 2020/0148263 | A1* | 5/2020 | Imai | B60W 30/095 |
| 2020/0159236 | A1* | 5/2020 | Yoon | B60R 25/2063 |

FOREIGN PATENT DOCUMENTS

| | | |
|---|---|---|
| DE | 102012015968 A1 | 3/2014 |
| DE | 102012021282 A1 | 4/2014 |
| DE | 102012222562 A1 | 6/2014 |
| DE | 102015007531 B3 | 9/2016 |
| EP | 2695797 A2 | 2/2014 |
| JP | 2011079372 A | 4/2011 |
| WO | 2014072909 A1 | 5/2014 |
| WO | 2016134827 A1 | 9/2016 |

OTHER PUBLICATIONS

Kyounghwan An et al: "Cooperative vehicle control system based on fusion map", Computing and Convergence Technology (ICCCT), 2012 7th International Conference on, IEEE, Dec. 3, 2012 (Dec. 3, 2012), pp. 94-97, XP032421998.

* cited by examiner

METHOD AND DEVICE FOR THE DRIVERLESS GUIDANCE OF A MOTOR VEHICLE WITHIN A PARKING LOT

FIELD

The present invention relates to a method and a device for the driverless guidance of a motor vehicle within a parking lot, as well as to a parking lot. The present invention also relates to a computer program.

BACKGROUND INFORMATION

German Patent Application No. DE 10 2012 222 562 A1 describes a system for managed parking areas for transferring a vehicle from a starting position to a target position.

SUMMARY

An object underlying the present invention is to provide for the efficient driverless guidance of a motor vehicle within a parking lot.

Advantageous embodiments of the present invention are described herein.

An aspect provides a method for the driverless guidance of a motor vehicle within a parking lot that includes the following steps:
  sensing one or a plurality of road user(s) located within the parking lot;
  predicting a respective movement of the one or the plurality of road user(s);
  automatic driverless guidance of the motor vehicle within the parking lot based on the respective predicted movement.

Another aspect provides a device for the driverless guidance of a motor vehicle within a parking lot that includes:
  a sensing device for capturing one or a plurality of road user(s) located within the parking lot;
  a predicting device for predicting a respective movement of the one or the plurality of road user(s);
  an automatic guide device for the automatic driverless guidance of the motor vehicle within the parking lot based on the respective predicted movement.

Another aspect provides that a parking lot for motor vehicles be provided that includes the device for the driverless guidance of a motor vehicle within a parking lot.

In accordance with another aspect, a computer program is provided that includes program code for implementing the method for the driverless guidance of a motor vehicle within a parking lot when the computer program is executed on a computer.

Thus, notably and inter alia, the present invention encompasses the idea of automatically guiding the motor vehicle without a driver within the parking lot based on a likely movement of the road users. Specifically, the technical advantage is thereby derived that the motor vehicle is able to be efficiently guided without a driver. Thus, based on the respective predicted movement, this enables the motor vehicle to be automatically guided without a driver in such a way that, during the movement thereof within the parking lot, the motor vehicle observes a predetermined minimum distance to the corresponding road user. A collision risk may thereby be advantageously minimized, for example.

The inventive concept notably permits a mixed operation of motor vehicles that are guided without a driver and of manually guided motor vehicles, as well as of persons, within a parking lot. Effectively, therefore, motor vehicles that are guided without a driver and manually guided motor vehicles, as well as persons may use the parking lot simultaneously. An efficient operation of the parking lot may thereby be advantageously ensured.

Along the lines of the present invention, a parking lot is a parking area for vehicles that has a plurality of parking spaces (in the case of a parking lot on private property) or parking spots (in the case of a parking lot on public property). An embodiment provides that the parking lot be a parking garage. An embodiment provides that the parking lot be an auto repair shop.

Along the lines of the present invention, vehicles are motor vehicles.

The formulation "respectively" encompasses the formulation "and/or," in particular.

An embodiment provides that an automatic driverless guidance of the motor vehicle include that the motor vehicle be remote controlled.

An embodiment provides that an automatic driverless guidance of the motor vehicle include that the motor vehicle drive autonomously, thus automatically within the parking lot. An embodiment provides that the automatic driverless guidance of the motor vehicle include that the motor vehicle drive a section within the parking lot autonomously, and that another section within the parking lot be remote controlled.

The remote control of the motor vehicle notably includes that one or a plurality of remote control command(s) be transmitted to the motor vehicle over a communications network.

If the motor vehicle is to drive autonomously within the parking lot, an embodiment provides that the automatic driverless guidance include that data the motor vehicle requires for the autonomous drive be transmitted to the motor vehicle over a communications network. Such data encompass the following data, for example: nominal trajectory data of a nominal trajectory that the motor vehicle is to drive; target position data of a target position that the motor vehicle is to drive to; correction data for a correction nominal trajectory to enable the motor vehicle to return to the nominal trajectory thereof to be driven.

Along the lines of the present invention, a road user notably refers to a person, for example, a pedestrian. Along the lines of the present invention, a road user notably refers to a motor vehicle that is manually guided. In the context of the present invention, a road user notably refers to an animal located within the parking lot. Thus, this means that, in the context of the present invention, road users are living objects, thus, for example, a person or an animal, or objects that contain a living object, for example, the manually guided motor vehicle, thus inside of which there is a human driver.

Predict notably refers to making a prediction. A prediction notably includes a statement about a future whereabouts of the road user, or rather a future movement by the road user. This means, for example, that the predicting includes ascertaining or determining which movement the road user will make in the future.

An embodiment provides that sensing the one or the plurality of captured road user(s) include a sensing of a manually guided motor vehicle to be parked; predicting the movement of the manually guided motor vehicle to be parked including that a parking position in the parking lot be determined for the manually guided motor vehicle to be parked, where the manually guided motor vehicle to be parked will be parked with a predetermined likelihood, the automatic driverless guidance of the motor vehicle being implemented on the basis of the determined parking position.

Specifically, the technical advantage is thereby derived that the motor vehicle is able to be efficiently guided without a driver. This is then especially dependent on the specific parking position where the manually guided motor vehicle will park with a predetermined likelihood. Thus, it may be provided, for example, that the motor vehicle is automatically guided without a driver, that it not drive by the specific parking position and, therefore, not be hindered by a parking maneuver of the manually guided motor vehicle.

An embodiment provides that the manually guided motor vehicle to be parked be sensed in response to a pulling thereof into the parking lot. Thus, this means that if a manually guided motor vehicle is sensed in response to a pulling thereof into the parking lot, it may be assumed that this manually guided motor vehicle intends to park at or on a parking position within the parking lot.

An embodiment provides that predicting the movement of the manually guided motor vehicle to be parked include determining a period of time for the manually guided motor vehicle to be parked to drive to the particular parking position; and/or determining a period of time for the manually guided motor vehicle to be parked to park in the particular parking position; the automatic driverless guidance of the motor vehicle being implemented on the basis of the determined driving duration and, as the case may be, the determined parking duration.

Specifically, the technical advantage is thereby derived that the motor vehicle is able to be efficiently automatically guided without a driver. This is then dependent on the determined or ascertained driving duration and, as the case may be, the determined parking duration. Thus, based on the determined parking duration, it is possible to compute or ascertain whether the manually guided motor vehicle has already parked, thus is already parking when the motor vehicle that is automatically guided without a driver drives past the determined parking position. If the manually guided motor vehicle is already parked, or rather has already parked when the motor vehicle that is automatically guided without a driver drives past the determined parking position, then there is no rerouting of the motor vehicle that is automatically guided without a driver.

A parking duration refers to a time period that the manually guided motor vehicle to be parked takes to park in the specific parking position.

The period of time for the manually guided motor vehicle to be parked to drive to the determined parking position refers to the period of time it requires to reach the specific parking position from the momentary position thereof.

Another specific embodiment provides that a size of the sensed manually guided motor vehicle to be parked, be determined; the parking position being determined on the basis of the ascertained size.

Specifically, the technical advantage is thereby derived that the parking position is able to be efficiently determined. Thus, in this way, when determining the parking position, those parking positions of the parking lot may remain out of consideration which, due to the size thereof, are not suited for the manually guided motor vehicle to be parked.

Another specific embodiment provides that a parking allocation table be provided that indicates which parking positions of the parking lot are used by motor vehicles for parking and at what frequency, the parking positions being determined on the basis of the parking allocation table.

Specifically, the technical advantage is thereby derived that the parking position is able to be efficiently determined.

Another specific embodiment provides that the sensing of the one or the plurality of captured road user(s) include a sensing of a manually guided motor vehicle to be unparked; predicting the movement of the manually guided motor vehicle that to be unparked including determining a period of time for unparking the manually guided motor vehicle to be unparked from the parking position thereof, and/or determining a period of time for the manually guided motor vehicle to be unparked to drive from the parking position thereof to a parking lot exit; the automatic driverless guidance of the motor vehicle being implemented on the basis of the determined period of time for unparking and, as the case may be, the determined driving duration.

Specifically, the technical advantage is thereby derived that the automatic driverless guidance of the motor vehicle may be efficiently implemented. This is then dependent on the determined period of time for unparking and, as the case may be, the determined driving duration. Thus, based on the determined period of time for unparking, it is possible to ascertain or compute whether the motor vehicle that is automatically guided without a driver drives past the parking position precisely at that instant when the manually guided motor vehicle that is to unpark is still engaged in an unpark operation. This could lead to a blocking of the motor vehicle. In such a case, an embodiment provides that the motor vehicle that is automatically guided without a driver be rerouted.

An embodiment provides that an automatic driverless guidance of the motor vehicle include that a longitudinal velocity of the motor vehicle be decreased. Thus, the motor vehicle drives more slowly. This is especially based on the determined period of time for unparking and, as the case may be, the determined driving duration. It may thus be advantageously ensured, for example, that the other motor vehicle has already unparked if the motor vehicle is to drive past the parking position of the other motor vehicle.

An embodiment provides that an automatic driverless guidance of the motor vehicle include that a point in time when the motor vehicle drives off to a parking position where it is to park, be ascertained or determined on the basis of the determined period of time for unparking and, as the case may be, the determined driving duration. Effectively, therefore, the motor vehicle still waits to drive off to the parking position thereof until the determined point in time has come. It may thus be advantageously ensured, for example, that the other motor vehicle has already unparked if the motor vehicle is to drive past the parking position of the other motor vehicle.

The period of time for unparking refers to the period of time that the manually guided motor vehicle needs to unpark from the parking position thereof, thus to exit the parking position thereof.

The driving duration of the manually guided motor vehicle that is to unpark from the parking position thereof to a parking lot exit refers to the period of time that the motor vehicle requires for a drive from the parking position to the parking lot exit.

Another embodiment provides that the sensing of the one or the plurality of captured road user(s) include a sensing of a pedestrian; predicting the movement of the pedestrian including that a motor vehicle to be parked within the parking lot be determined to which the pedestrian will walk with a predetermined likelihood; the automatic driverless guidance of the motor vehicle being implemented on the basis of a parking position of the particular motor vehicle.

Specifically, the technical advantage is thereby derived that the motor vehicle is able to be efficiently automatically guided without a driver. This is based on the parking position of the specific motor vehicle to which the pedestrian will walk with a predetermined likelihood. Thus, this makes it advantageously known, that notably, in the foreseeable future, this motor vehicle will unpark from the parking position thereof and, thus, could possibly obstruct the motor vehicle that is automatically guided without a driver on the drive thereof within the parking lot. Accordingly, a nominal trajectory may then be adapted for the motor vehicle that is automatically guided without a driver.

Another specific embodiment provides that the sensing of the one or the plurality of captured road user(s) include a sensing of a pedestrian, a walkway allocation table being provided that indicates which walkways are used by pedestrians within the parking lot and at what frequency, the movement of the pedestrian being predicted on the basis of the walkway allocation table.

Specifically, the technical advantage is thereby derived that the movement is able to be efficiently predicted. This is then dependent on the walkway allocation table.

An embodiment provides that the device for the driverless guidance of a motor vehicle within a parking lot be adapted or designed for executing or implementing the method for the driverless guidance of a motor vehicle within a parking lot.

An embodiment provides that the method for the driverless guidance of a motor vehicle within a parking lot be executed or implemented by the device for the driverless guidance of a motor vehicle within a parking lot.

An embodiment provides that a sensing device include one or a plurality of driving environment sensor(s). A driving environment sensor is one of the following, for example: a video sensor, a radar sensor, a lidar sensor, a laser sensor, an ultrasonic sensor or a magnetic sensor.

An embodiment provides that the automatic driverless guidance of the motor vehicle include that a nominal trajectory be determined for the motor vehicle on the basis of the respective predicted movement. An embodiment provides that this ascertained nominal trajectory be transmitted to the motor vehicle over a communications network. Thus, the motor vehicle may drive autonomously on the basis of the nominal trajectory.

In accordance with an embodiment, the automatic driverless guidance of the motor vehicle includes that, on the basis of the respective predicted movement, a target position be determined for the motor vehicle that the motor vehicle is to drive to. In accordance with an embodiment, the ascertained target position is transmitted to the motor vehicle over a communications network. Therefore, based on the target position, the motor vehicle is able to drive autonomously; notably, therefore, autonomously to the target position.

An embodiment provides that the automatic driverless guidance of the motor vehicle include that a nominal trajectory for the motor vehicle be determined on the basis of the respective predicted movement, the motor vehicle being remote controlled on the basis of the ascertained nominal trajectory.

An embodiment provides that the automatic driverless guidance of the motor vehicle include that, based on the respective predicted movement, a target position for the motor vehicle be determined that the motor vehicle is to drive to, the motor vehicle being remote controlled on the basis of the ascertained target position.

A target position for the motor vehicle is, for example, a parking position at or on which the motor vehicle is to park. A target position is, for example, a pick-up position in the parking lot where a person intends to, or rather may pick up the motor vehicle following the automatic guidance without a driver.

An embodiment provides that an automatic driverless guidance of the motor vehicle include an automatic parking operation. Effectively, therefore, the motor vehicle carries out an automatic parking operation within the parking lot. This is based on the respective predicted movement. An automatic parking operation includes that the motor vehicle drives automatically to a parking position and parks there. The automatic parking, or rather the automatic parking operation includes that the motor vehicle drives from the parking position to a pick-up position.

In an embodiment, the communications network includes a WLAN communications network and/or a wireless communications network and/or a LoRa communications network. "LoRa" stands for "low-power long-range communication." Thus, the LoRa communications network refers to a communications network according to the LoRa standard.

In an embodiment, a communication over the communications network is encrypted.

The automatic driverless guidance of the motor vehicle includes notably a lateral and/or a longitudinal guidance of the motor vehicle.

An embodiment provides that the automatic driverless guidance be carried out in such a way that a predetermined minimum distance be observed in each case between the motor vehicle that is guided without a driver and the captured road users. This means that the motor vehicle is automatically guided without a driver in such a way that, during the drive thereof within the parking lot, the motor vehicle that is guided without a driver features or observes a predetermined minimum distance to the captured road users in each case.

Technical functionalities of the device are derived analogously from the corresponding technical functionalities of the method and vice versa. Effectively, therefore, analogously to the corresponding specific embodiments of the method, the sensing device and, as the case may be, the predicting device and, as the case may be, the guide device are designed to execute or implement the corresponding method steps.

The present invention is described in greater detail below with reference to preferred exemplary embodiments. In the drawing.

The method includes the following steps:

sensing 101 one or a plurality of road user(s) within the parking lot;

predicting 103 a respective movement of the one or the plurality of road user(s);

automatic driverless guidance 105 of the motor vehicle within the parking lot based on the respective predicted movement.

Figure 1:
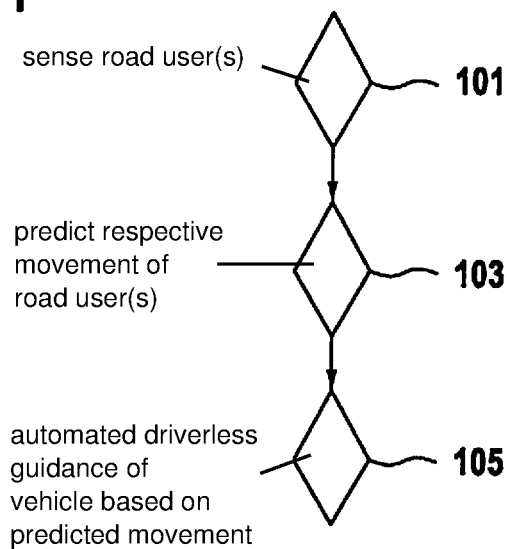
FIG. 1 shows a flow chart of a method for the driverless guidance of a motor vehicle within a parking lot.
Figure 2:
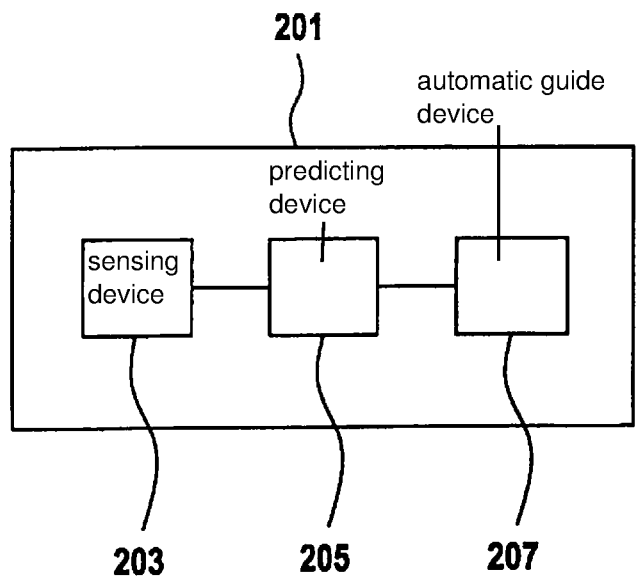
FIG. 2 shows a device for the driverless guidance of a motor vehicle within a parking lot.

FIG. 2 shows a device 201 for the driverless guidance of a motor vehicle within a parking lot.

Device 201 includes:
- a sensing device 203 for capturing one or a plurality of road user(s) located within the parking lot;
- a predicting device 205 for predicting a respective movement of the one or the plurality of road user(s);
- an automatic guide device 207 for the automatic driverless guidance of the motor vehicle within the parking lot based on the respective predicted movement.

In an embodiment, device 201 includes a communication interface for communicating with the motor vehicle over a communications network. The communications interface is designed, for example, for transmitting one or a plurality of remote control command(s) to the motor vehicle over the communications network. The communications network is designed, for example, for transmitting data that the motor vehicle requires for an autonomous drive within the parking lot to the motor vehicle over a communications network.

Effectively, therefore, an embodiment provides that the automatic guide device be designed to determine one or a plurality of such remote control command(s), or rather such data based on the respective predicted movement.

An embodiment provides that a parking lot management system encompass device 201. Such a parking lot management system is designed to control an operation of the parking lot, or rather controls an operation thereof. The parking lot management system notably controls an automatic parking operation for motor vehicles.

Figure 3:
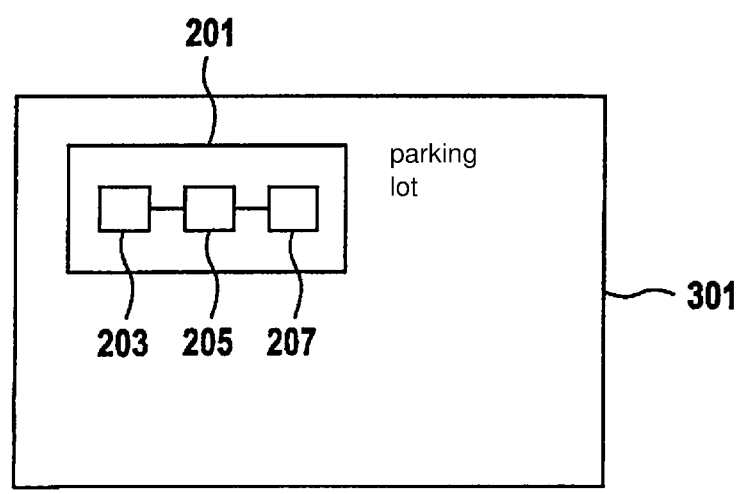
FIG. 3 shows a parking lot for motor vehicles.

FIG. 3 shows a parking lot 301 for motor vehicles in a simplified, schematic representation.

Parking lot 301 includes device 201 of FIG. 2. For example, parking lot 301 includes one or a plurality of driving environment sensor(s) for capturing the road users. Parking lot 301 includes a plurality of parking positions (not shown), thus parking spots or parking spaces.

In summary, the present invention provides an efficient technical concept that will optimize, or rather permit optimization of a traffic control of motor vehicles that are intended to be, or rather are automatically guided without a driver on the basis of a knowledge, or rather determination of a likely driving behavior of manually guided motor vehicles, or rather a likely walking pattern of persons, in particular of pedestrians or animals.

The fundamental idea of the present invention resides, for example, in a parking lot management or parking lot management system implementing a driverless drive of the motor vehicle from a transfer position, also referred to as drop zone, to the parking position, which may also be in the form of a parking bay and, as the case may be, in an unpark operation for the motor vehicle and in a drive from the parking position to the pick-up position, that may also be referred to as a pick-up zone and, as the case may be, in a rescheduling of a momentarily executed automatic drive of a motor vehicle guided without a driver as a function of the likely behavior of manually guided motor vehicles and/or persons, thus generally of road users. This means, for example, that AVP operations are planned in such a way that a defined minimum distance from the motor vehicle that is guided without a driver to the road users is observed, or rather is observed with a predetermined likelihood.

AVP stands for "automatic valet parking" and for "automatic parking operation." Thus, AVP motor vehicles are vehicles, for example, thus motor vehicles that are able to implement, or rather that implement such an automatic parking operation. Thus, AVP motor vehicles are motor vehicles that are able to drive autonomously, or rather be remote controlled within a parking lot.

In effect, the inventive concept makes it advantageously possible to achieve, for example, that AVP motor vehicles are able to preferably execute the tasks thereof (automatic driving and/or automatic parking and, as the case may be, unparking) without braking and stopping, which, in an unfavorable situation, could take place on a ramp, for example.

An exemplary sequence of the method encompasses that the device included by a parking lot management system, for example,
- determines the time periods likely needed by the manually guided vehicles for the tasks thereof (driving, parking, unparking);
- based on the determined likely time periods, ascertains the parameters (starting times, velocities, etc.) for the AVP operations of that motor vehicle which is to be automatically guided without a driver; and
- subsequently starts the AVP operations, thus the driverless guidance; and/or
- reschedules a driverless drive of an AVP motor vehicle based on the determined likely periods of time, or rather adapts it to the determined likely periods of time; thus, for example, the parameters for the AVP operations, thus the driverless driving, are adapted and, as the case may be, reprogrammed, particularly when the AVP motor vehicle is already under way, thus is already driving without a driver.

In an embodiment in which a motor vehicle is sensed that is to park (thus, is to drive to a parking position, for example, a parking bay, and park there), one or a plurality of the following step(s) is/are provided:
- sensing a manually guided vehicle at an entrance to the parking lot;
- determining the parking position where the vehicle is most likely to park;
- determining a time period for the vehicle to drive from the entrance to the particular parking position.
- determining a parking duration.

In an embodiment that provides for a vehicle that is to unpark to be sensed (thus, a vehicle that has unparked from the parking position thereof and drives to the parking lot exit), one or a plurality of the following step(s) is/are provided:
- sensing a vehicle that is to unpark;
- ascertaining a period of time for unparking or rather an end time point therefor;
- ascertaining a driving duration from the parking position to the parking lot exit.

In an embodiment that provides for sensing a pedestrian within the parking lot, one or a plurality of the following step(s) is/are provided:
- sensing a pedestrian walking toward a motor vehicle (for example, the pedestrian is coming from a staircase exit).
- ascertaining a walking time that the pedestrian needs to arrive at his/her motor vehicle;
- To determine which motor vehicle the pedestrian will walk to, it is assumed, for example, that he/she will walk to the parking motor vehicle that is the closest to his/her current position.
- To determine which motor vehicle the pedestrian will walk to, it is assumed, for example, that he/she will walk to the parking motor vehicle that is the furthest from his/her current position.
- To determine which motor vehicle the pedestrian will walk to, it is assumed, for example, that, relative to his/her momentary position, the pedestrian will walk to a parking motor vehicle that is centrally located between the parking motor vehicle that is the closest to his/her momentary position and the parking motor vehicle that is the furthest from his/her momentary position. Centrally "located" refers, in particular to a 10% range around the central position relative to the furthest motor vehicle being parked.

Analogously to the above explanations, a period of time for unparking and, as the case may be, a driving duration from the parking position to the exit is also determined for this motor vehicle to which the pedestrian will walk with a predetermined likelihood.

An embodiment provides that predefined periods of time be used for the periods of time described within the scope of this description. Thus, the predefined periods of time are not newly ascertained each time, but are stored in a memory, for example.

To achieve adequate security, another embodiment provides that the predefined periods of time be maximized, taking potential complications into account.

When ascertaining the parking bay, another embodiment considers which levels, parking bays, etc., are the favorite. This is based, for example, on stored data and/or on data that are ascertained by the parking lot management system.

When determining the parking bay, another embodiment considers the dimensions of the vehicle to be parked and the dimensions of the available parking bays. This means, for example, that the first parking bay is not probable or possible due to the dimensions.

For the AVP scheduling, another embodiment also takes into consideration the probable walkways the drivers will use. An example is from the parking bay to an exit. This means, for example, that it is checked whether the probable walkways would interfere with an AVP operation. If so, the AVP operation, thus generally the driverless guidance, is adapted accordingly.

What is claimed is:

1. A method for driverless guidance of a motor vehicle within a parking lot, comprising:
   sensing at least one road user other than the motor vehicle within the parking lot;
   predicting a respective movement of the at least one road user; and
   automatic driverless guiding the motor vehicle within the parking lot based on the respective predicted movement;
   wherein the at least one road user other than the motor vehicle includes a manually guided motor vehicle to be parked, the predicting the movement of the at least one road user includes predicting a movement of the manually guided motor vehicle, including determining a parking position in the parking lot where the manually guided motor vehicle will be parked with a predetermined likelihood, and the automatic driverless guiding of the motor vehicle is implemented based on the determined parking position.

2. The method as recited in claim 1, wherein in the predicting including the predicting the movement of the manually guided motor vehicle to be parked, wherein at least one of: (i) a period of time to drive to the determined parking position is ascertained, or (ii) a period of time for the manually guided motor vehicle to be parked in the determined parking position is determined; the automatic driverless guidance of the motor vehicle being implemented based on the at least one of the determined period of time to drive or the determined period of time for the manually guided motor vehicle to be parked.

3. The method as recited in claim 1, further comprising:
   determining a size of the sensed manually guided motor vehicle to be parked, the parking position being determined on the basis of the ascertained size.

4. The method as recited in claim 1, wherein a parking allocation table is provided that indicates which parking positions of the parking lot are used by motor vehicles for parking and at what frequency, the parking position being determined on the basis of the parking allocation table.

5. The method as recited in claim 1, wherein the sensing of the at least one road user includes sensing of a manually guided motor vehicle that is to unpark, predicting a movement of the manually guided motor vehicle that is to unpark including at least one of: (i) determining a period of time for unparking the manually guided motor vehicle to be unparked from the parking position, or (ii) determining a period of time for the manually guided motor vehicle to drive from the parking position thereof to a parking lot exit; wherein the automatic driverless guidance of the motor vehicle is implemented based on the at least one of the determined period of time for unparking or the determined period of time for the manually guided motor vehicle to drive.

6. The method as recited in 1, wherein the at least one road user includes a pedestrian, the predicting the respective movement of the at least one road user includes predicting a movement of the pedestrian including determining a motor vehicle parking position within the parking lot to which the pedestrian will walk with a predetermined likelihood, wherein the automatic driverless guiding of the motor vehicle is implemented based on the determined parking position to which the pedestrian will walk with the predetermined likelihood.

7. The method as recited in claim 1, wherein the at least one road user includes a pedestrian, a walkway allocation table being provided that indicates which walkways are used by pedestrians within the parking lot and at what frequency, and the predicting the movement of the at least one road user includes predicting the movement of the pedestrian based on the walkway allocation table.

8. A device for driverless guidance of a motor vehicle within a parking lot, comprising:
   a sensing device for capturing at least one road user other than the motor vehicle located within the parking lot;
   a predicting device for predicting a respective movement of the at least one road user; and
   an automatic guide device for automatic driverless guidance of the motor vehicle within the parking lot based on the respective predicted movement;
   wherein the at least one road user other than the motor vehicle includes a manually guided motor vehicle to be parked, the predicting the movement of the at least one road user includes predicting a movement of the manually guided motor vehicle, including determining a parking position in the parking lot where the manually guided motor vehicle will be parked with a predetermined likelihood, and the automatic driverless guiding of the motor vehicle is implemented based on the determined parking position.

9. A parking lot for motor vehicles, comprising:
   a device for driverless guidance of a motor vehicle within a parking lot, including:
   a sensing device for capturing at least one road user other than the motor vehicle located within the parking lot;
   a predicting device for predicting a respective movement of the at least one road user; and an automatic guide device for automatic driverless guidance of the motor vehicle within the parking lot based on the respective predicted movement;

wherein the at least one road user other than the motor vehicle includes a manually guided motor vehicle to be parked, the predicting the movement of the at least one road user includes predicting a movement of the manually guided motor vehicle, including determining a parking position in the parking lot where the manually guided motor vehicle will be parked with a predetermined likelihood, and the automatic driverless guiding of the motor vehicle is implemented based on the determined parking position.

10. A non-transitory computer-readable storage medium on which is stored a computer program, the computer program, when executed by a computer, causing the computer to perform a method for driverless guidance of a motor vehicle within a parking lot, the method comprising:

sensing at least one road user other than the motor vehicle within the parking lot;

predicting a respective movement of the at least one road user; and automatic driverless guiding the motor vehicle within the parking lot based on the respective predicted movement;

wherein the at least one road user other than the motor vehicle includes a manually guided motor vehicle to be parked, the predicting the movement of the at least one road user includes predicting a movement of the manually guided motor vehicle, including determining a parking position in the parking lot where the manually guided motor vehicle will be parked with a predetermined likelihood, and the automatic driverless guiding of the motor vehicle is implemented based on the determined parking position.

* * * * *